Patented Jan. 18, 1927.

1,614,943

UNITED STATES PATENT OFFICE.

GEORGE BARSKY, OF NEW YORK, N. Y., AND FREDERICK W. FREISE, OF PALMYRA, NEW JERSEY, ASSIGNORS TO AMERICAN CYANAMID COMPANY, OF NEW YORK, N. Y.

PROCESS OF PRODUCING FERTILIZER MATERIALS.

No Drawing. Application filed July 23, 1923. Serial No. 653,354.

This invention relates to a method of facilitating the production of acid phosphate in the manufacture of fertilizer materials, and to a process of securing the finished products in a minimum length of time. It relates to the treatment of those phosphates that are difficult to decompose with sulphuric acid. It causes the chemical combination to proceed rapidly and the materials to arrive at a degree of acidulation that would be impossible in the ordinary method of rock acidulation.

The object of the invention is to produce a dry, granular acid phosphate associated with a readily available nitrogenous compound. An additional object is to so utilize a phosphate rock of the type known as refractory, that the results may be comparable with those obtained with easily acidulated rock. With these and other objects in view the invention consists in the various steps and combination of steps constituting the process, and in the new product, all as will be more fully hereinafter described and particularly pointed out in the claims.

To make the invention clear a couple of illustrations are given which cover some of the combinations that are possible under this invention. To 900 parts by weight of 52° Bé. sulphuric acid in the acidulating pan, are added 1000 parts by weight of Tennessee brown rock dust, and as soon as the mass has reacted, which requires about two to three minutes it is discharged into the den to set. After being broken up and removed from the den in accordance with the usual practice of fertilizer manufacturers, it was found that 81% of the phosphoric acid was available. The above case is given as a check and does not fall within the scope of this invention. It is given by way of contrast to show the advantages of adding excess of acid, and then calcium cyanamid. To 1100 parts by weight of the acid are added 1000 parts by weight of phosphate rock, as before, and 75 parts by weight of calcium cyanamid. The percentage of availability in this case amounted to 87%. To 1300 parts by weight of acid are added, as before 1000 parts of the phosphate rock, and then 150 parts by weight of calcium cyanamid. In this case the availability was 90%. In all the above cases the style of treatment was similar.

The above striking illustrations of the advantages of the invention show that a twofold purpose is served. The availability of the phosphoric acid is increased and a considerable amount of nitrogen is incorporated in the mass. The addition of a greater amount of acid than is usually employed in the production of acid phosphate is very beneficial, providing a suitable method, such as that forming an important feature of this invention, is devised to get rid of this excess.

In the case of the Tennessee brown rock dust, and other phosphate rocks of similar character, the acid phosphate made from them is heavy and possesses very little of the honey-comb structure so desired by phosphate manufacturers. The rock is high in alumina and iron and very low in easily decomposible carbonates, and consequently liberates in the body of the mass but little gas during the den period and when, what may be described as the "rising", is taking place.

For some reason that we cannot explain, the addition of the calcium cyanamid overcomes this difficulty and the fertilizer material in the den liberates gas during the coalescing period, and retains it in the body of the mass, thereby forming the desired honey-comb. The addition of the calcium cyanamid also gives the material the requisite degree of dryness and its ability to crumble.

It is obvious that those skilled in the art may vary the details of the process as well as the materials added, as well as the order of their addition, without departing from the spirit of the invention, and therefore we do not wish to be limited to the above disclosures except as may be required by the claims.

We claim:

1. A method of producing a fertilizer material which comprises adding to 1300 parts by weight of 52 Be. acid in an acidulating pan, 1000 parts by weight of refractory phosphate rock, and in from two to three minutes adding 150 parts of calcium cyanamid, discharging the whole into a den, and removing, breaking up and depositing in heaps as soon as the mass has hardened; substantially as described.

2. A new fertilizer, the same being dry, granular and of a honey-comb texture, and comprising acid phosphate high in alumina and iron and associated with calcium cyanamid; substantially as described.

3. A new fertilizer, existing in the den in the form of a dry honey-comb mass, the same containing essentially acid phosphate high in iron and alumina; substantially as described.

GEORGE BARSKY.
FREDERICK W. FREISE.